United States Patent
Izadi et al.

(10) Patent No.: US 12,254,603 B2
(45) Date of Patent: Mar. 18, 2025

(54) ADAPTIVE WAVELET DENOISING

(71) Applicant: GOOGLE LLC, Mountain View, CA (US)

(72) Inventors: Mohammad Izadi, San Jose, CA (US); Pavan Madhusudanarao, San Jose, CA (US); Balineedu Adsumilli, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 392 days.

(21) Appl. No.: 17/908,068

(22) PCT Filed: May 19, 2020

(86) PCT No.: PCT/US2020/033655
§ 371 (c)(1),
(2) Date: Aug. 30, 2022

(87) PCT Pub. No.: WO2021/236070
PCT Pub. Date: Nov. 25, 2021

(65) Prior Publication Data
US 2023/0119747 A1      Apr. 20, 2023

(51) Int. Cl.
*G06T 5/70*       (2024.01)
*G06T 5/20*       (2006.01)

(52) U.S. Cl.
CPC .................. *G06T 5/70* (2024.01); *G06T 5/20* (2013.01); *G06T 2207/20021* (2013.01); *G06T 2207/20064* (2013.01)

(58) Field of Classification Search
None
See application file for complete search history.

(56) References Cited

U.S. PATENT DOCUMENTS

| | | |
|---|---|---|
| 6,768,518 B1 | 7/2004 | Bozdagi |
| 7,599,095 B2 | 10/2009 | Berkner et al. |
| | (Continued) | |

FOREIGN PATENT DOCUMENTS

| | | |
|---|---|---|
| CN | 109377463 A | 2/2019 |
| JP | 2009-098742 A | 5/2009 |
| WO | 2007/001236 A1 | 1/2007 |

OTHER PUBLICATIONS

International Search Report and Written Opinion of International Application No. PCT/US2020/033655 dated Feb. 2, 2021, 14 pgs.
(Continued)

*Primary Examiner* — Darryl V Dottin
(74) *Attorney, Agent, or Firm* — Young Basile Hanlon & MacFarlane, P.C.

(57) ABSTRACT

Image data is processed for noise reduction before encoding and subsequent decoding. For an input image in a spatial domain, two-dimensional (2-D) wavelet coefficients at multiple levels are generated. Each level includes multiple subbands, each associated with a respective subband type in a wavelet domain. For respective levels, a flat region of a subband is identified, which flat region includes blocks of the subband having a variance no higher than a first threshold variance. A flat block set for the subband type associated with the subband is identified, which includes blocks common to respective flat regions of the subband. A second threshold variance is determined using variances of the flat block set, and is then used for thresholding at least some of the 2-D wavelet coefficients to remove noise. After thresholding, a denoised image is generated in the spatial domain using the levels.

20 Claims, 10 Drawing Sheets

(56) References Cited

U.S. PATENT DOCUMENTS

2004/0008904 A1 1/2004 Lin et al.
2008/0085060 A1 4/2008 Bosco et al.
2013/0338475 A1* 12/2013 Herzog .............. A61B 5/14542
            600/407
2019/0266725 A1* 8/2019 Zalev .................. A61B 5/7225

OTHER PUBLICATIONS

Jang et al, "Denoising of Inages Using Locally Adaptive Wiener Filter in Wavelet Domain"; IEICE Trans. Inf. & Syst., vol. E84-D, No. 4, Apr. 2001, pp. 495-501.
Zhou Dengwen and Shen Xiiaoliu, "Image Denoising Using Block Thresholding", 2008 Congress on Image and Signal Processing, IEEE, May 27, 2008, pp. 335-338.
P. Porwik and A. Lisowska, "The Haar-Wavelet Transform in Digital Image Processing: Its Status and Achievements", Machine Graphics & Vision, vol. 13, No. 1/2, 2004, pp. 79-98.
M. Izadi, et al, "Mutual Noise Estimation Algorithm for Video Denoising", 2019 IEEE International Conference on Image Processing, pp. 2424-2428.
David Donoho, "De-Noising by Soft Thresholding", IEEE Transactions on Information Theory, vol. 41, No. 3, May 1995, pp. 613-627.

* cited by examiner

ADAPTIVE WAVELET DENOISING

BACKGROUND

Digital images and video can be used, for example, on the internet, for remote business meetings via video conferencing, high-definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth, such as image and video coding using efficient noise reduction coding.

SUMMARY

This application relates generally to encoding and decoding of image data, video stream data, or both, for transmission or storage. Disclosed herein are aspects of systems, methods, and apparatuses for processing image data (e.g., before encoding and decoding) by denoising an image using adaptive wavelet denoising. In some implementations, a wavelet shrinkage-based denoising technique is used.

An aspect of this disclosure is a method for processing image data. The method can include generating, for an input image in a spatial domain, two-dimensional (2-D) wavelet coefficients at a plurality of levels, and, for respective levels of the plurality of levels, identifying a flat region of the subband of the multiple subbands comprising blocks of the subband having a variance no higher than a first threshold variance. The method also includes identifying a flat block set for the subband type associated with the subband comprising blocks that are common to respective flat regions of the subband, determining a second threshold variance using variances of the blocks of the flat block set, thresholding, using the second threshold variance, at least some of the 2-D wavelet coefficients at the plurality of levels to remove noise, and after thresholding, generating a denoised image in the spatial domain using the plurality of levels.

Another aspect of this disclosure is an apparatus for processing image data can include a processor to perform the method.

Variations in these and other aspects will be described in additional detail hereafter.

BRIEF DESCRIPTION OF THE DRAWINGS

The description herein makes reference to the accompanying drawings wherein like reference numerals refer to like parts throughout the several views unless otherwise noted or otherwise clear from context.

FIG. 6A shows dimensions of subbands of the two-dimensional wavelet coefficients resulting from two-dimensional wavelet decomposition of the input image using the filter bank of FIG. 5, while FIG. 6B shows the two-dimensional wavelet transform coefficients that form the subbands of FIG. 6A.

DETAILED DESCRIPTION

Figure 1:
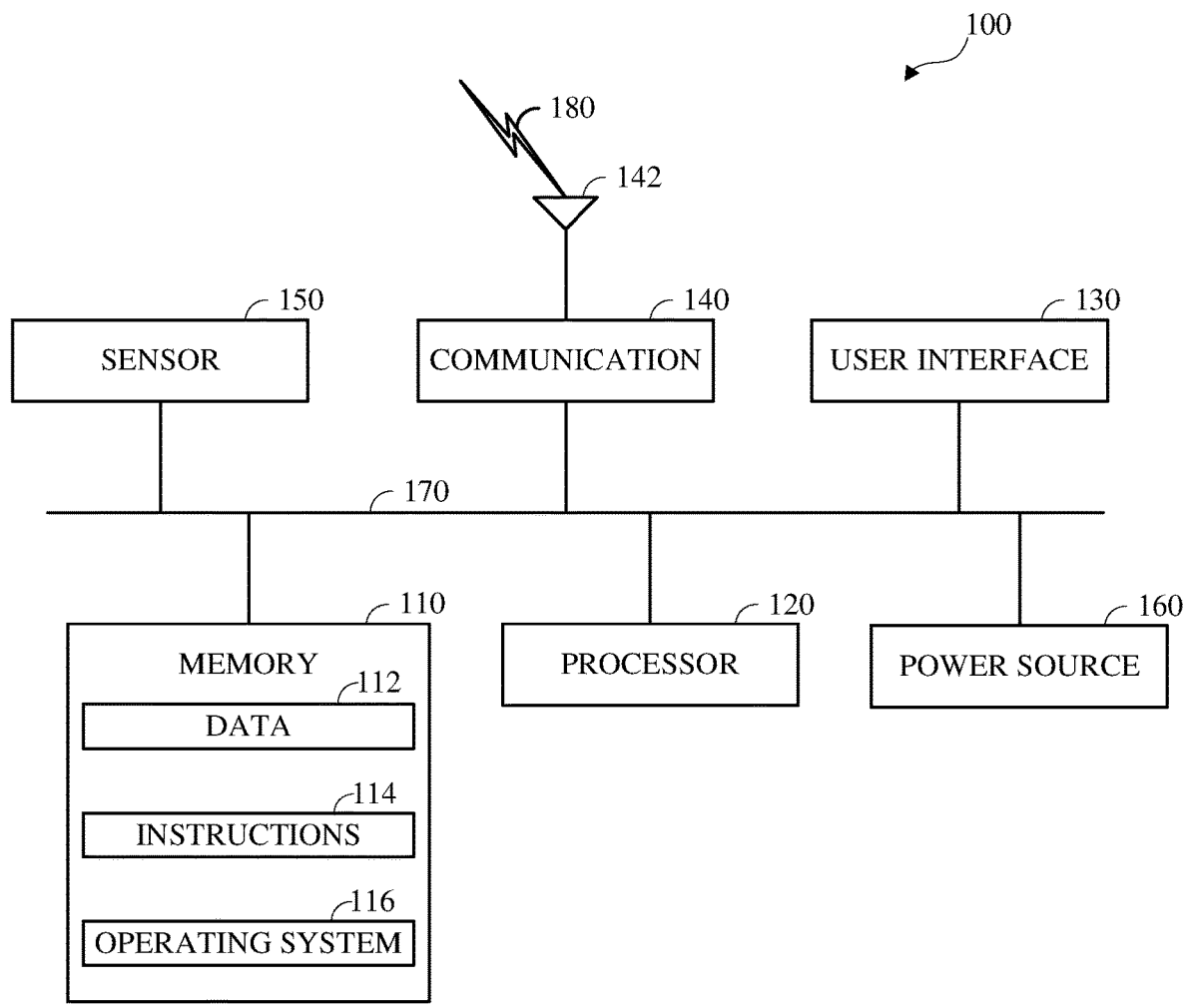
FIG. 1 is a diagram of a computing device in accordance with implementations of this disclosure.

Image and video compression schemes may include dividing an image, or frame, into smaller portions, such as blocks, and generating an output bitstream using techniques to limit the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients, quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to recreate the blocks and the source images from the limited information.

Input frames, such as images or video frames, may include input noise. Input noise may reduce coding efficiency, such as by utilizing bandwidth for encoding noise information and reducing the accuracy and efficiency of coding. Input noise can also reduce visual quality. The input noise may include, for example, ambient thermal noise, noise caused defects of video acquisition pipeline, such as sensor defects, lens defects, image signal processing defects, or a combination thereof, or any other input noise.

Denoising the image data of an image or frame before coding may improve the efficiency and accuracy of coding. Further, visual quality may be improved. However, difficulties exist in denoising. The noise characteristics may be unknown (e.g., there is no access to a reference) such that denoising cannot be tailored to expected noise. Further, and even when some knowledge of the noise to be expected exists, it may be difficult to determine the noise characteristics. For example, noise statistics may be time-varying, have non-stationary distributions, or both. As another example, different noise types may occur in different portions of an image or frame, and over time across frames in a video sequence.

As a result of these difficulties, techniques for denoising may be complex, resulting in a high computational load (e.g., central processing unit) consumption, a lengthy time period for processing each image, or both. Further, previous efforts to implement fast denoising have resulted in under- or over-denoising images, leading to low image quality, reduced bitrate savings, or both.

The present disclosure describes using wavelets for denoising, also referred to as noise reduction herein. Wavelets provide for fast computation, which is particularly desirable in real-time applications, such as video streaming. Wavelets provide for simultaneous time and frequency localization in contrast to Fourier transforms, for example, which have acceptable frequency localization but are a poor choice for time localization. Further, the basis for wavelets (e.g., scaling and translation) involves approximation coefficients, which intuitively represent low frequency components, and detail coefficients, which capture high frequency components. This basis allows the wavelet denoiser described herein to adapt to noise with varying characteristics, even when no information is available regarding the type of noise expected in an image or frame. Adaptive wavelet denoising that accurately reduces input image noise (e.g., in substantially real-time) is described below after an example of an environment in which the teachings herein may be implemented.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can capture an image such as the image of a user operating the computing device. Although a single sensor 150 is shown, the computing device 100 may include a number of sensors 150. For example, the computing device 100 may include a first camera oriented in a first direction, such as with a field of view directed toward a user of the computing device 100, and a second camera oriented in another direction, such as with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170. Although a single bus 170 is shown in FIG. 1, a computing device 100 may include multiple buses.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
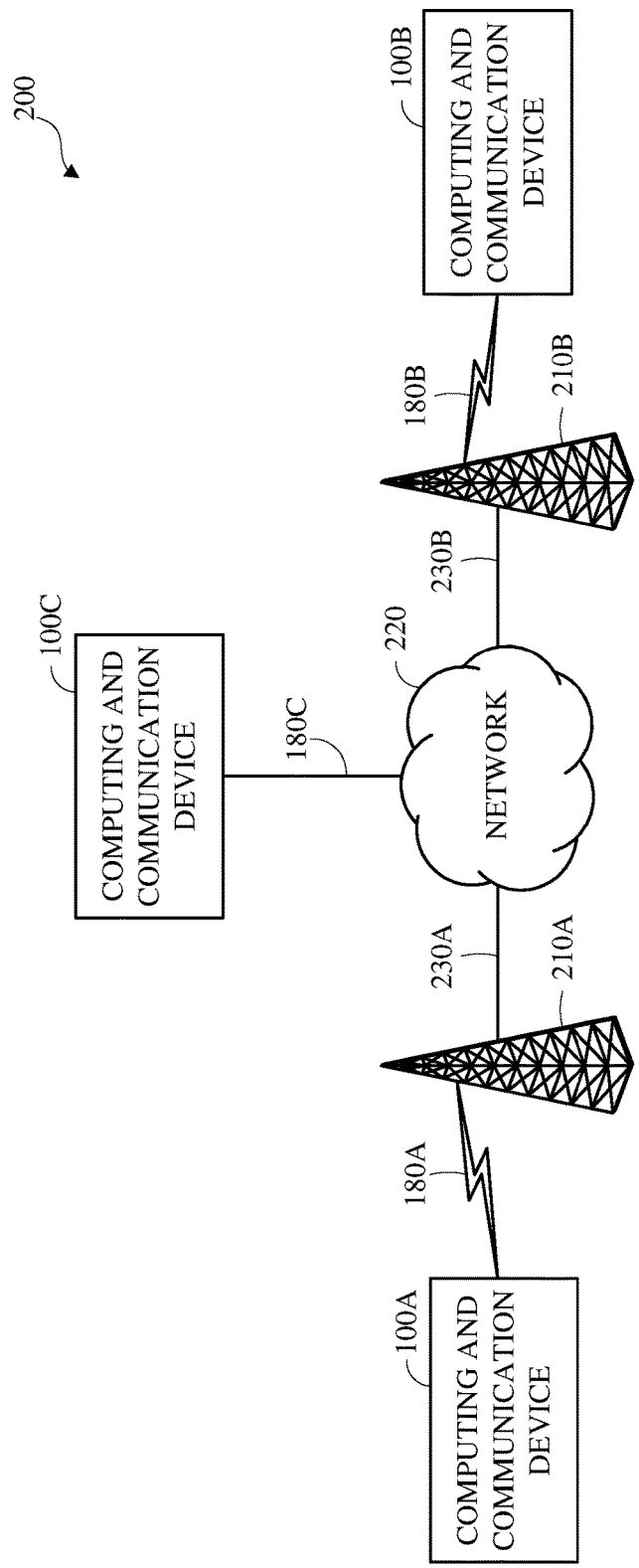
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data, and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper-Text Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
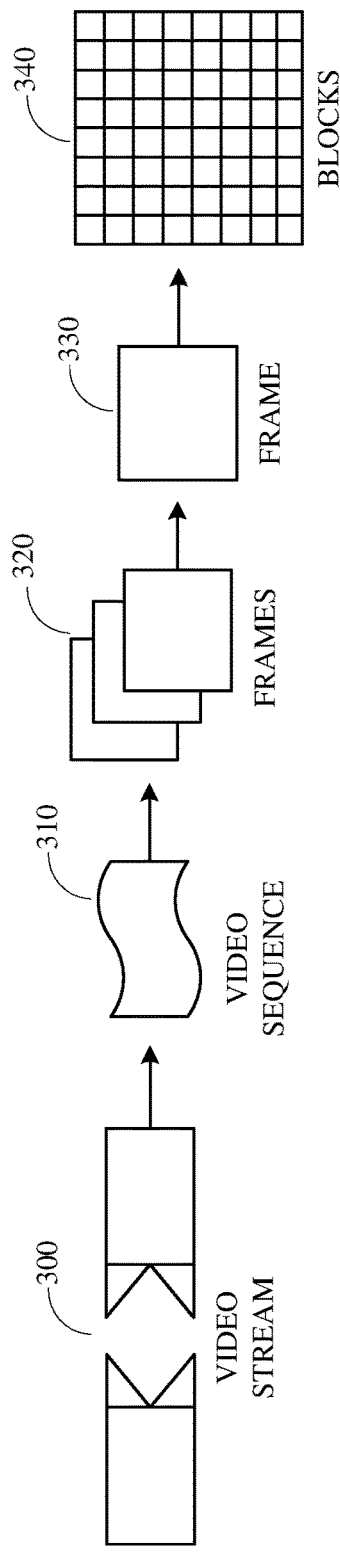
FIG. 3 is a diagram of a video stream that may provide image data to be processed in accordance with implementations of this disclosure.

FIG. 3 is a diagram of a video stream 300 that may provide image data to be processed in accordance with implementations of this disclosure. The video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. An image, a frame, a block, a pixel, or a combination thereof can include display information, such as luminance information, chrominance information, or any other information that can be used to store, modify, communicate, or display the video stream or a portion thereof.

Figure 4:
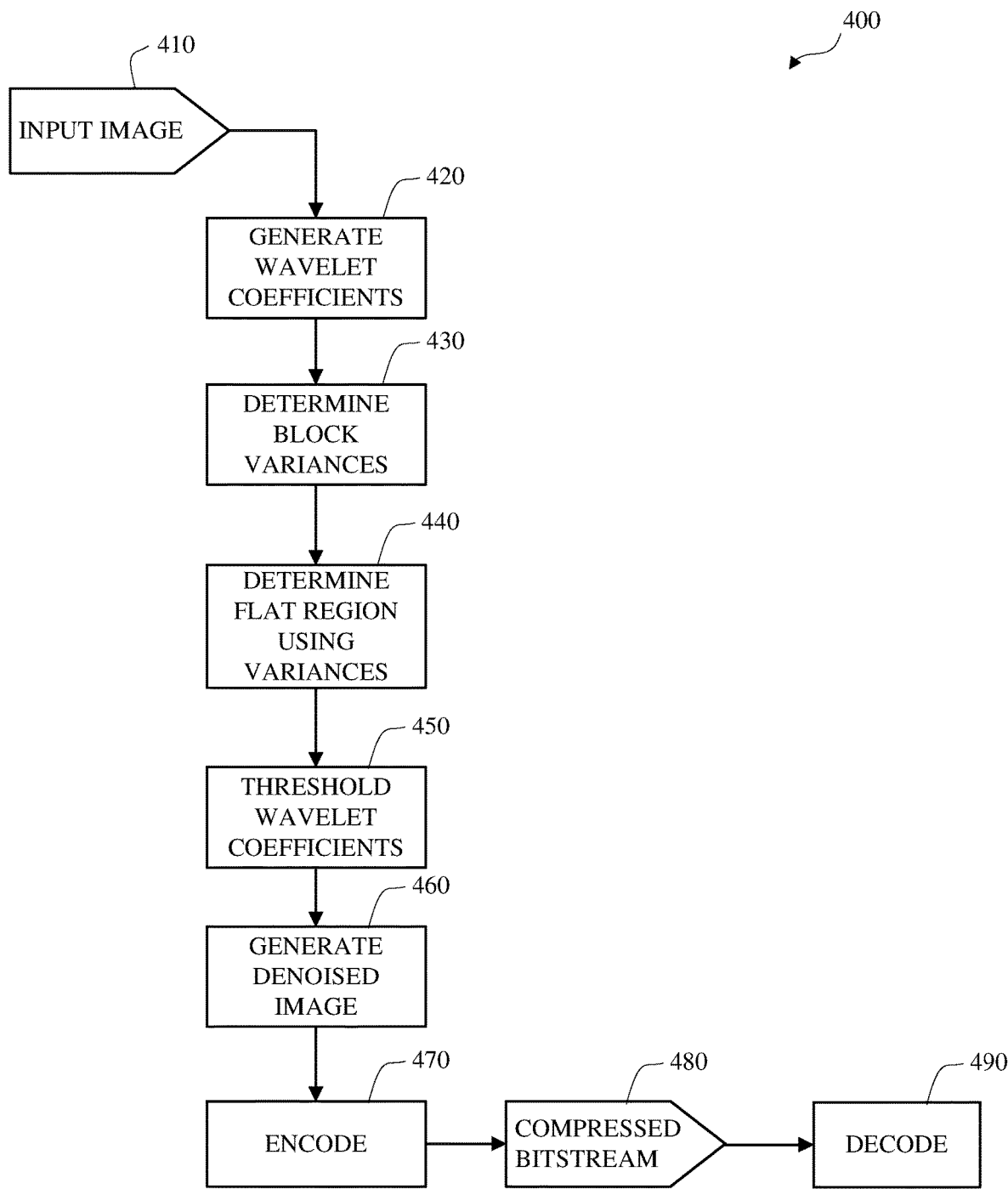
FIG. 4 is a flowchart diagram of an example method of processing image data for noise reduction in accordance with implementations of this disclosure.

FIG. 4 is a flowchart diagram of an example method 400 of processing image data for noise reduction in accordance with implementations of this disclosure. The method 400 can be implemented in a device, such as the computing device 100 shown in FIG. 1 or the computing and communication devices 100A, 100B, 100C shown in FIG. 2. In some implementations, the method 400 may be implemented by a computer software program stored in a data storage unit, such as the memory 110 shown in FIG. 1. The computer software program can include machine instructions that may be executed by a processor, such as the processor 120 shown in FIG. 1, and may cause the device to process image data as described herein. In some implementations, the method 400 may be implemented by specialized hardware described below, or by a combination of such specialized hardware and software.

The method 400 may include obtaining or receiving an input image at 410, which input image includes the image data to be processed. In the examples of the method 400 described herein, a single image is processed. However, the teachings herein apply equally single input images, and to input images that form respective frames of a video sequence, such as an uncompressed input, or source, video frame. For example, the processor executing or performing the method 400, such as the processor 120, may receive, or otherwise access, an input image or input video stream or signal, or a portion thereof, such as the video stream 300, and may identify a frame as the input image. The input image may be received at a frame buffer and be buffered before the method 400 advances to further process the image.

The input image is in the spatial (e.g., pixel) domain. The input image may comprise more than one layer or plane of data. For example, where the input image is in red-green-blue (RGB) format, each layer of data represents the pixel values forming the image in a respective color plane. Where the input image is in luminance-chrominance (e.g., YUV) format, each of three layers of data represents the pixel values forming the image in the luminance and two chrominance planes, respectively. The particular format of the input image is not limited, and any color format, resolution, etc., may be used. When the input image comprises multiple planes or layers of data, each layer may be denoised separately, or fewer than all layers may be denoised. For example, when the input image is in YUV format, the denoising steps of the method 400 may be performed on only the image data of the luminance plane Y.

At 420, denoising begins with generating, for the input image in the spatial domain, two-dimensional (2-D) wavelet coefficients at a plurality of levels. Each level of the plurality of levels may comprise multiple subbands in a wavelet domain. Each subband may be associated with a respective subband type in a wavelet domain.

Generating the 2-D wavelet coefficients can include performing 2-D wavelet decomposition with the input image providing a 2-D input signal. In an implementation, a discrete wavelet transform (DWT) is used for generating the 2-D wavelet coefficients. More specifically, the discrete function f[n] is a weighted summation of wavelets ψ[n], plus a coarse approximation (or scaling function) φ[n] as shown generally by equation (1) below.

$$f[n] = \frac{1}{\sqrt{M}} \sum_{k} W_\phi[j_0, k]\phi_{j_0,k}[n] + \frac{1}{\sqrt{M}} \sum_{j \geq j_0} \sum_{k} W_\psi[j, k]\psi_{j,k}[n] \quad (1)$$

In equation (1), M is the length of the input signal (here the 2-D input signal from the input image), n=0,1,2, . . . M, $\phi_{j,k}[n]=2^{j/2}\phi[2^j n-k]$, $\psi_{j,k}[n]=2^{j/2}\psi[2^j n-k]$, and $W_\phi$ and $W_\psi$ are the approximation and detail coefficients calculated based on the input signal, where $J_0$ is an arbitrary starting scale. In general, the approximation coefficients denote low pass components while detail coefficients denote high pass frequencies. The wavelets ψ[n] and the coarse approximation φ[n] depend upon the characteristics of the wavelet family. That is, the wavelets may comprise any family of orthogonal wavelets forming a DWT such as, but not limited to, a Haar wavelet transform or a Daubechies wavelet transform.

In the examples described herein, generating the 2-D wavelet coefficients at the plurality of levels at 420 comprises applying a Haar wavelet transform, also called a Haar transform, to the input image in the spatial domain. The Haar transform is used in the examples because it forms a relatively simple discrete wavelet filter. Generating the 2-D wavelet coefficients at the plurality of levels is illustrated initially with reference to FIGS. 5 and 6A-6B.

Figure 5:
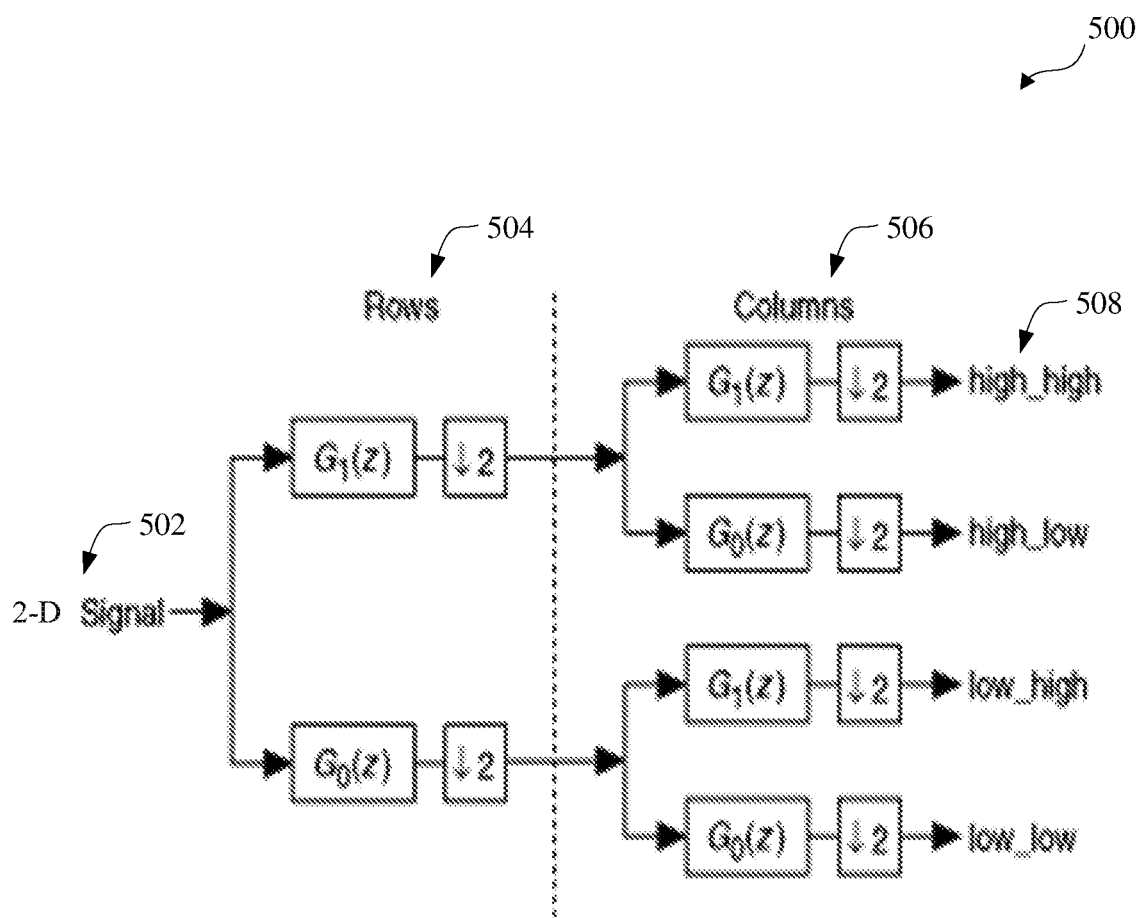
FIG. 5 is a block diagram of a filter bank that may be used for generating two-dimensional wavelet coefficients.

FIG. 5 is a block diagram of a filter bank 500 that may be used for generating the 2-D wavelet coefficients according to some implementations of the teachings herein. The filter bank 500 illustrates an example of a DWT that uses wavelets for multiresolution analysis. More specifically, a 2-D signal 502, such as the input image or a layer thereof as described above, is input into the filter bank 500. The filter bank 500 comprises a plurality of separable wavelet filters $G_1(z)$ and $G_0(z)$, Haar transforms in this example, that are applied to the 2-D signal 502 in a recursive fashion, leading to a one-dimensional (1-D) convolution along rows 504 and columns 506 of the input image. In this example, 2-D wavelet coefficients at a level are generated for the 2-D input signal 502 in the spatial domain such that the level comprises multiple subbands in the wavelet domain. As shown, the level (i.e., the output of the filter bank 500) comprises four subbands 508 in the wavelet domain, where the four subbands 508 include a subband of a low-low (LL) subband type, a subband of a low-high (LH) subband type, a subband of a high-low (HL) subband type, and a subband of a high-high (HH) subband type. While four subbands 508 are shown in this example, this is not required. The multiple subbands comprise at least two subbands.

Figure 6A:
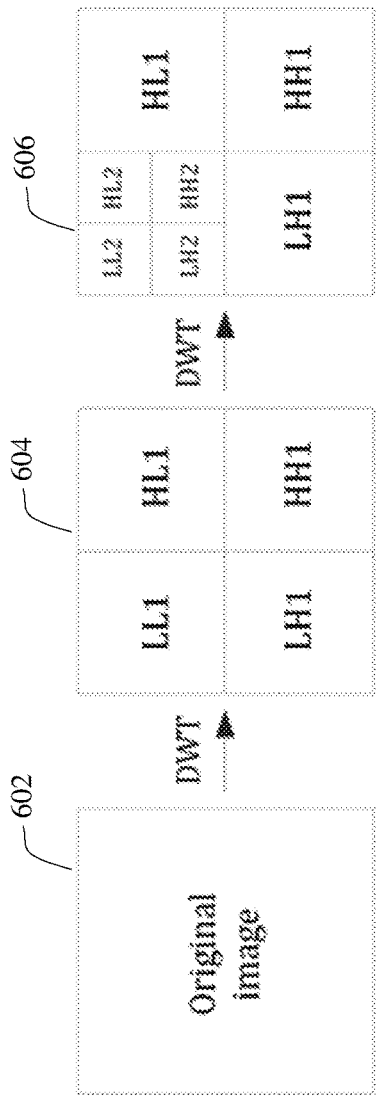
FIGS. 6A and 6B are diagrams illustrating generation of two-dimensional wavelet coefficients at a plurality of levels for an input image.
Figure 6B:
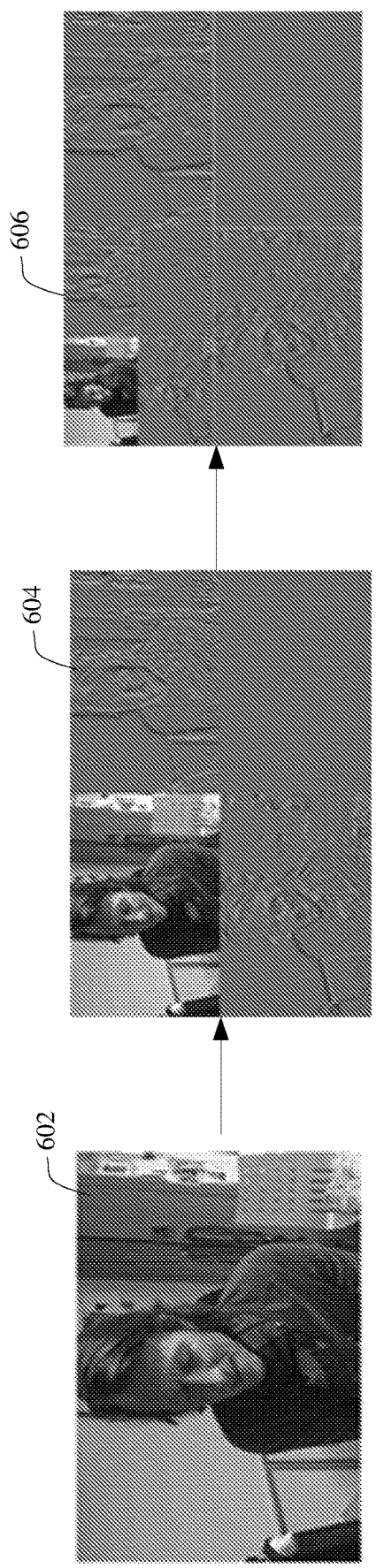

FIGS. 6A and 6B are diagrams illustrating generation of 2-D wavelet coefficients at a plurality of levels for an input image 602 that is in the spatial domain. FIG. 6A shows dimensions of subbands of the 2-D wavelet coefficients resulting from 2-D wavelet decomposition of the input image 602 using the filter bank 500 of FIG. 5, while FIG. 6B shows the 2-D wavelet transform coefficients that form the subbands of FIG. 6A.

The input image 602 comprises a grayscale image in the spatial domain. Applying a DWT, such as a Haar transform, to the input image 602 results in a first level 604 comprising multiple subbands in the wavelet domain. Because this example uses the filter bank 500, the multiple subbands of the first level 604 include a first LL subband (LL1), a first LH subband (LH1), a first HL subband (HL1), and a first HH subband (HH1). The second level 606 results from applying the DWT to the 2-D wavelet coefficients of the first level 604. In this example, the 2-D wavelet coefficients of the first level 604 provide the input to the filter bank 500. The multiple subbands of the second level 606 include a second LL subband (LL2), a second LH subband (LH2), a second HL subband (HL2), and a second HH subband (HH2).

In viewing FIGS. 6A and 6B, it can be seen that the 2-D wavelet coefficients at the plurality of levels (here, two levels) comprise decimated 2-D wavelet coefficients. Referring back to FIG. 5, this occurs because the wavelet decomposition of a 2D signal 502, such as the input image 602, involves downsampling after convolution with the wavelet filters $G_1(z)$ and $G_0(z)$. The 2-D wavelet coefficients generated at the plurality of levels at 420 instead may be undecimated 2-D wavelet coefficients. This may be achieved by applying undecimated wavelets to the input image at 420. In an implementation, instead of downsampling the image data after every level, the filters may be upsampled after every level by padding up zeros to increase the filter length. In this way, the 2-D wavelet coefficients are of the same image dimensions (or size) as the input image.

Figure 7:
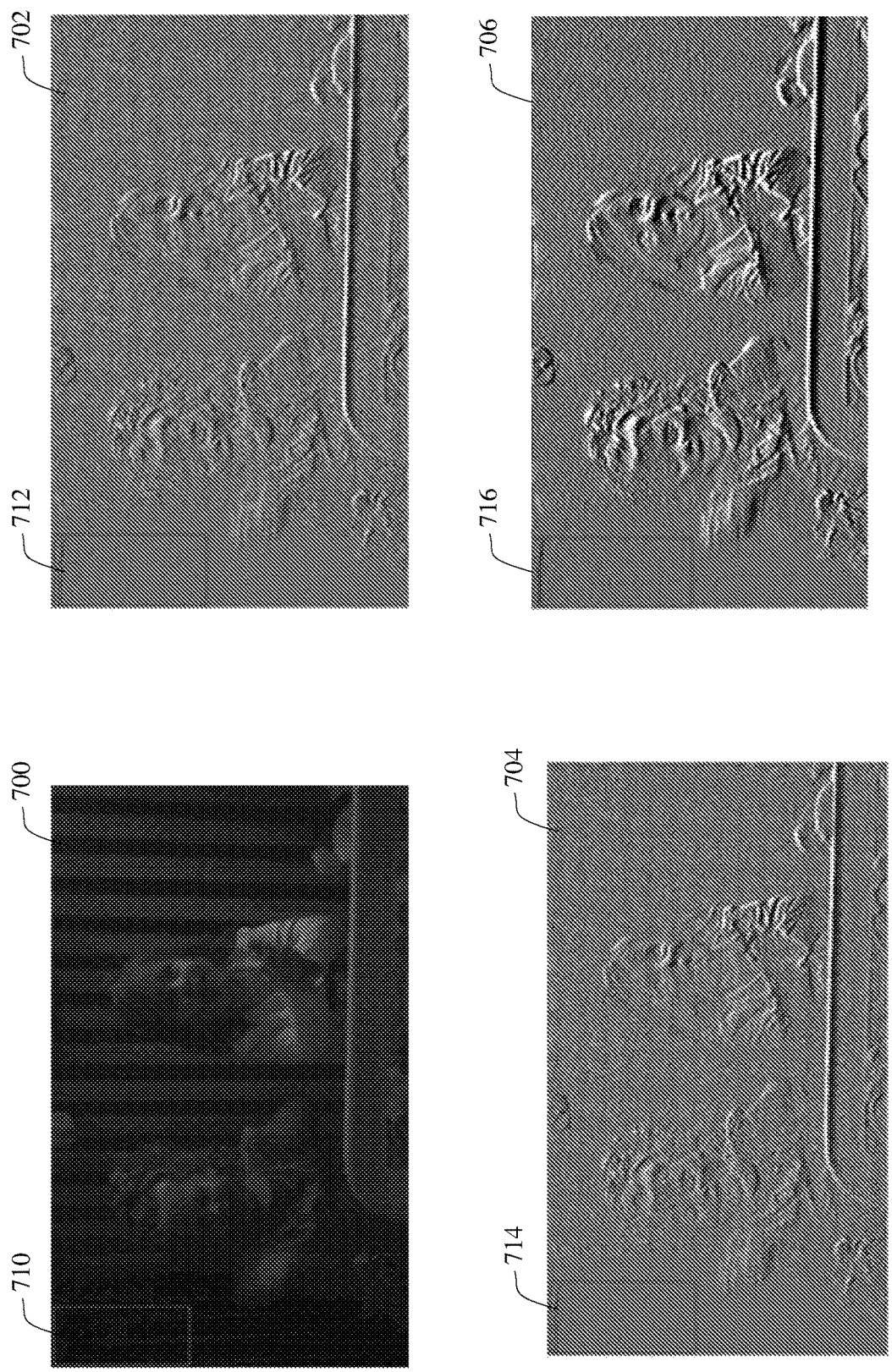
FIG. 7 is a group of diagrams illustrating undecimated two-dimensional wavelet transform coefficients and flat regions of each of three levels of two-dimensional transform coefficients.

FIG. 7 is a group of diagrams illustrating undecimated 2-D wavelet transform coefficients. In FIG. 7, the input image 700 is a color image. Hence, generating the 2-D wavelet transform coefficients includes generating one or more sets of 2-D wavelet transform coefficients, each set corresponding to a respective plane of the input image 700. A set of 2-D wavelet transform coefficients comprises all of the 2-D wavelet transform coefficients for all of the levels generated for a single plane. In the example shown, 2-D wavelet transform coefficients are generated for three levels by performing the upsampling described above using a Haar filter with a luma plane of the input image 700 as input. A HH subband 702 for the first level (HH1), a HH subband 704 for the second level (HH2), and a HH subband 706 for the third level (HH3) are shown by example, but each of the levels also has three HL subbands, three LH subbands, and three LL subbands.

Either decimated wavelets or undecimated wavelets can be used to generate the 2-D wavelet coefficients at 420 for the subsequent steps of the method 400. Undecimated wavelets are shift invariant in that a shift in the original image results in transformed coefficients also being shifted by the same amount. Decimated wavelets are inherently not shift invariant. Thus, using decimated 2-D wavelet coefficients can result in blocking artifacts in a final denoised image. For this reason, although increased processing time and space complexity result, using undecimated wavelets to generate undecimated 2-D wavelet coefficients may be preferred instead of using decimated wavelets to generate decimated 2-D wavelet coefficients for some implementations.

The wavelet subbands can be useful for denoising because visible noise present in the spatial domain gets translated to values in the wavelet domain that are small relative to other image features. In FIG. 7, for example, a noisy region 710 in the input image 700 results in respective noisy regions 712, 714, and 716 having comparatively lower values for wavelet coefficients when compared to other regions of the HH subbands 702, 704, 706.

A straightforward way to remove the noise observed in the wavelet domain is through thresholding. That is, 2-D wavelet coefficients having less than a predetermined threshold may be made zero, while others are unchanged. However, this could lead to over- or under-denoising an image because the threshold is independent of the noise level. In contrast, the denoising described herein is adaptive for each subband type using respective variances.

In general, an image X without noise is corrupted by additive noise N, resulting in a noisy image Y such that Y=X+N. In the wavelet domain, it is assumed that if a region in the frame is flat or homogeneous, that region only contains the noise signal such that the variance of the region would be close to noise variance. Assuming further that the noise signal is uncorrelated and the co-variance of the noise signal and image is very small such that it can be ignored, the variance of the flat regions in at least some of the subbands of a particular type (e.g., LH, HL, and HH) at every level would be close to the noise power. That is, using these assumptions, noise variance remains constant across different levels for a subband type. For example, referring to three subbands of the HH subband type shown in FIG. 7, the variance of each of the $HH_1$ subband 702, the $HH_2$ subband 704, and the $HH_3$ subband 706 of the noisy input image Y (i.e., input image 700) is equal to the variance of the image X without noise plus the noise variance $\sigma_N^2$ of the noise signal N as follows.

$$\mathrm{Var}(Y_{HH_1}) = \mathrm{Var}(X_{HH_1}) + \sigma_N^2$$

$$\mathrm{Var}(Y_{HH_2}) = \mathrm{Var}(X_{HH_2}) + \sigma_N^2$$

$$\mathrm{Var}(Y_{HH_3}) = \mathrm{Var}(H_{HH_3}) + \sigma_N^2$$

If the image has (e.g., flat/homogeneous/smooth) regions where all intensity values are close in value, then the portions of the 2-D waveform coefficients in these regions attributable to the image X are approximately 0. Accordingly, $\mathrm{Var}(X_{HH_1}) \approx \mathrm{Var}(X_{HH_2}) \approx \mathrm{Var}(X_{HH_3}) \approx 0$, and the 2-D waveform coefficients are substantially attributable to noise within the noisy image such that $\mathrm{Var}(Y_{HH_1}) \approx \mathrm{Var}(Y_{HH_2}) \approx \mathrm{Var}(Y_{HH_3}) \approx \sigma_N^2$. These insights can be used to determine a threshold for denoising an image whose value is adaptive to the subbands generated from the image as described below.

Denoising begins, after the 2-D wavelet coefficients are generated at 420, by determining or otherwise identifying, for respective levels of the plurality of levels, a flat region of a subband of the multiple subbands. A flat region of a subband comprises blocks of the subband having a variance that is no higher than a first threshold variance. Referring to FIG. 4, by example, the method 400 can include determining, for the subband of the multiple subbands and for respective levels of the plurality of levels, a variance for blocks of the subband at 430 and determining a flat region using the variances at 440.

Determining variances for blocks of a subband at a level at 430 can include dividing the subband at a level into non-overlapping blocks as described above with regards to the blocks 340. The blocks may comprise blocks of equal sizes, such as N×N blocks. Once the subband is divided, a respective block variance of each of the non-overlapping blocks of the subband can be determined. A block variance may be determined using the 2-D wavelet coefficients of the block as input to equation (2) below.

$$s^2 = (\Sigma_{i=1}^{n}(x_i - \bar{x})^2)/(n-1) \qquad (2)$$

In equation (2), $s^2$ is the variance of the block, n is the number of 2-D wavelet coefficients in the block, $\bar{x}$ is the mean of the 2-D wavelet coefficients, and $x_i$ is the current ith 2-D wavelet coefficient of the set of n 2-D wavelet coefficients. For example, if the block is an 8×8 block, the number of undecimated 2-D wavelet coefficients n is 64. Equation (2) is one example of a calculation to determine the variance of a block. It is also possible to determine the variance of a block by calculating local variances within the block and combining those local variances (e.g., by weighting or averaging them).

Once variances for blocks within a respective subband are determined at 430, they may be compared to the first threshold variance to determine one or more flat regions of the subband at 440. The first threshold variance is a variance level for the subband below which the 2-D transform coefficients in that subband represent noise. The blocks may be thresholded such that the blocks within the subband having a variance no higher than (e.g., below) the first threshold level form one or more flat regions of the subband. The first threshold variance may be different for each subband of a level or for each subband type. The first threshold variance may be a fixed value for a subband/subband type that is developed a priori using experimental data. The first threshold variance may be a value that is otherwise predefined using experimental data, such as a fixed percentage of the variance of the subband determined using variances of the blocks.

It can be more desirable, however, to adaptively determine the first threshold value for a respective subband type using the reasoning above that the variance of the noisy image at each level of the corresponding wavelet decomposition is approximately equal to the noise variance (e.g., $\mathrm{Var}(Y_{HH_1}) \approx \mathrm{Var}(Y_{HH_2}) \approx \mathrm{Var}(Y_{HH_3}) \approx \sigma_N^2$) where flat regions exist such that the variance attributable to the image without noise is approximately equal to zero (e.g., $\mathrm{Var}(X_{HH_1}) \approx \mathrm{Var}(X_{HH_2}) \approx \mathrm{Var}(X_{HH_3}) \approx 0$). However, the noise variance is not a fixed value over different blocks due to illumination, color, etc.; instead, the noise variance is different over blocks and has a range of values from 0 to a variable x. Accordingly, failure to consider the subband data of a particular image in determining the variance attributable to noise results in, at best, imprecise noise reduction of that image.

One technique that can be used to determine the first threshold level for identifying flat regions that is adaptive to the subband data of a particular image is to determine the variance for each level of a subband type, and then use those variances to determine the first threshold level, e.g., by combining those variances. Determining the variance for a subband can involve generating a function for the variance of the subband at a level using the variances for the blocks within the subband at the level. That is, the variance of a subband can be a function of the block variances. Combining the functions can then identify a variance of the subband type. That variance for the subband type is the first threshold level—the noise variance $\sigma_N^2$ for the subband type.

The function for each level of a subband may define a curve for the subband that maps the possible values for the noise variance against the block variances. In one example, the function maps values for a maximum power of noise (i.e., a maximum variance) in the subband against an average of noise power (i.e., an average variance) over all blocks with a variance less than the maximum power of noise. As described above, the noise power or variance is often different over blocks and ranges from a minimum of 0 to a maximum value, the variable x. Starting with x=0, the average noise and variance of all of the blocks in the subband at a level that have a variance less than x is determined. Then, the value of x is incremented up to a maximum value, determining the average at each value. The value of x may be incremented by a fixed step, such as 0.01 or another value, or by a variable step. This process forms multiple candidates for the variance of a subband at a level.

The function described above may be represented by equation (3) below.

$$U\_Subband_l(x) = average(Z), \text{ where } Z = \{z | z \text{ in Subband}_l \text{ and } z \le x\} \quad (3)$$

Figure 8A:
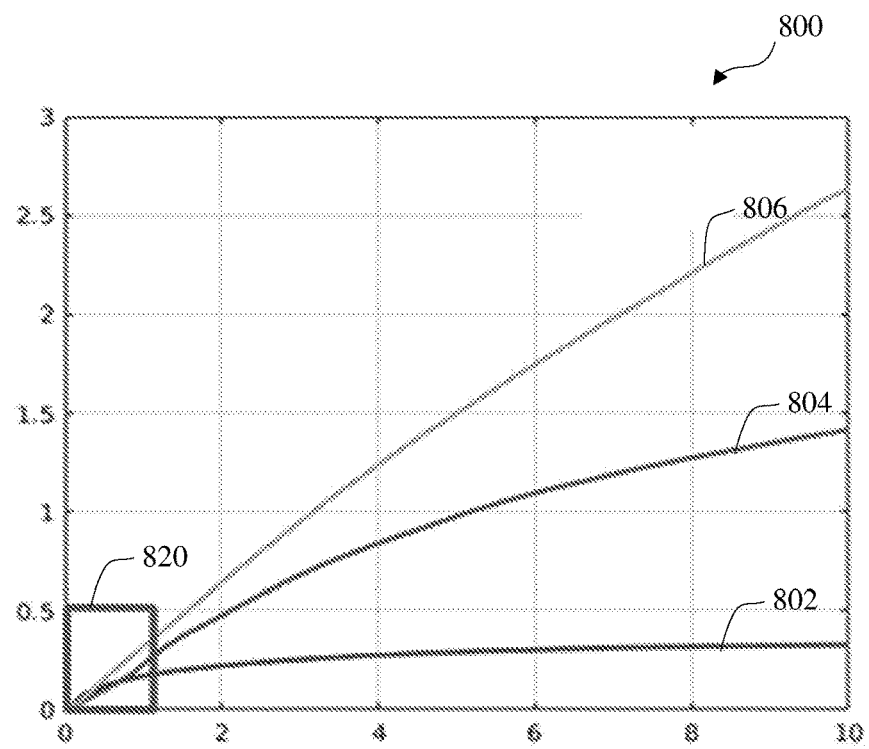
FIG. 8A is a graph of a function of the two-dimensional wavelet transforms for the three levels of FIG. 7.

In equation (3), $Subband_l$ comprises the set of variances z for the blocks of a subband (e.g., HH, LH, or HL) at level l, Z comprises the variances of the set of variances z that are less than or equal to the current value for x, and $U\_Subband_l(x)$ is the average of the variances Z at the current value for x at level l. FIG. 8A is a graph 800 of a function of the two-dimensional wavelet transforms for the three levels of the HH subband type of FIG. 7. In this example, a first curve 802 is generated using equation (3) with the variances of blocks of the $HH_1$ subband 702, a second curve 804 is generated using equation (3) with the variances of blocks of the $HH_2$ subband 704, and a third curve 806 is generated using equation (3) with the variances of blocks of the $HH_3$ subband 706. The maximum variance represented by the values of x range from 0 to 10 at an incremental step of 0.01. Thus, the x-axis in FIG. 8A comprises the values for x, and the y-axis comprises the average of the set of variances for the blocks of the respective subbands that are less than or equal to respective values for x.

Figure 8B:
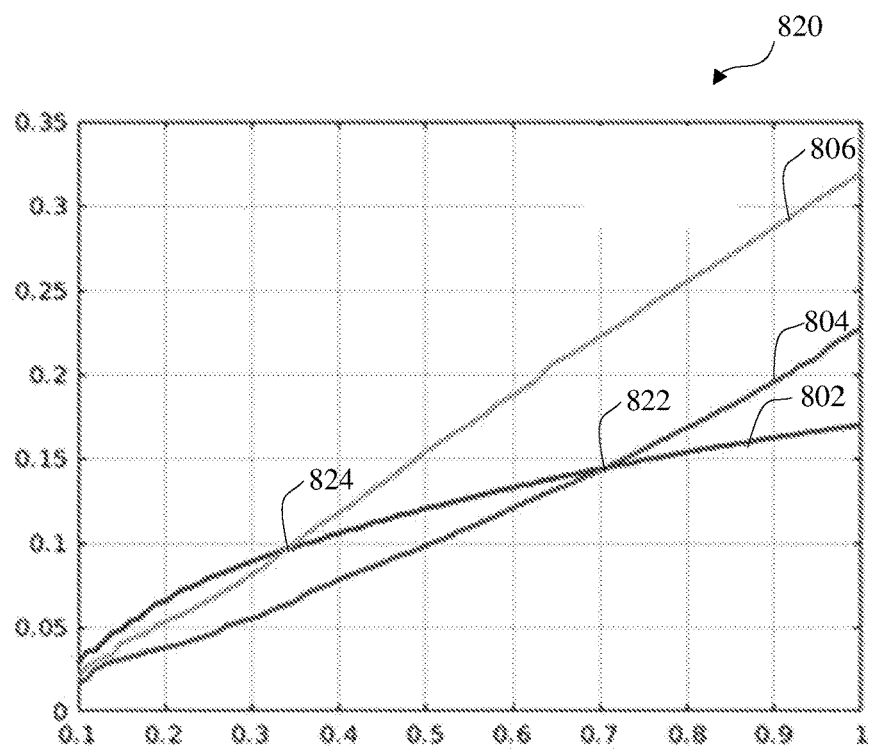
FIG. 8B is an enlarged portion of the graph of FIG. 8A.

FIG. 8B is an enlarged portion of the graph 800 of FIG. 8A, which enlarged portion of the graph 800 is identified in part by the box 820 in FIG. 8A. Ideally, each curve of the subband for each level meets at a single intersection point, and the x-value at this intersection point is the maximum variance that corresponds to the noise variance $\sigma_N^2$ for the subband type. That is, determining the first threshold variance may include determining the intersection point of the curves as the first threshold variance.

However, and as can be seen from FIG. 8B, the curves more often intersect at slightly different points when more than two levels of 2-D wavelet coefficients for a subband are generated (and hence there are more than two variance curves). In some implementations, determining the first threshold variance includes determining an average of intersection points of the curves as the first threshold variance (e.g., an approximate point of intersection as the intersection point of the curves). For example, and referring to FIG. 8B, there is a first intersection point 822 of the first curve 802 and the second curve 804, generally at x=0.7, and a second intersection point 824 of the first curve 802 and the third curve 806, generally at x=0.35. These points may be averaged together to determine the first threshold variance, namely x=0.535. In some implementations, determining the first threshold variance includes determining a point before convergence or after divergence of the curves where the curves are all located within a defined distance, such as 5% of the maximum distance between two curves, as the first threshold variance.

Once the first threshold variance for a subband type is determined, the first threshold variance can be used at 440 to determine or identify the flat regions of the 2-D wavelet coefficients for a subband associated with the subband type for respective levels of the plurality of levels. For example, one or more flat regions of the subband of a level can be identified by identifying the blocks of the subband having a variance no higher than, or less than or equal to, the first threshold variance for the subband type as the flat region of the subband. Examples of some flat regions 712, 714, and 716 for three levels of 2-D wavelet coefficients are shown in FIG. 7.

Once the flat regions for a subband are determined at 440, they may be used for thresholding 2-D wavelet coefficients at 450. In the above description, determining a respective first threshold variance for a subband type, and then determining one or more flat regions for subbands associated with the subband type at respective levels using the variances of the blocks and the first threshold variance may be performed for each subband type. More desirably, determining the block variances at 430 and determining the flat region(s) at 440 are performed only for detail (high pass) subband types, such as HH, LH, and HL subband types in this example, while the approximation coefficients (low pass), such as included in the LL subband type in this example, are not processed. For this reason, in some implementations, the detail subbands (e.g., detail coefficients) may be thresholded at 450, while the approximation coefficients are left unmodified.

Thresholding at 450 uses a second threshold variance. The second threshold variance may be determined using variances of the flat regions. For example, the variances of all blocks forming the flat regions of a subband may be averaged or otherwise combined to determine a second threshold variance for the thresholding on a per-level basis, that is, each subband at a level may have its own second threshold variance. In some implementations, before thresholding at 450, the method 400 can include identifying a flat block set for a subband type comprising blocks that are common to each flat region of a subband of the plurality of levels associated with the subband type. In the example of FIG. 7, the flat or noisy regions 712, 714, and 716 all include blocks in common in that they are associated with the same pixel positions of the image 700, here the flat or noisy region 710. For a subband type, a second threshold variance may be similarly determined by combining variances of the blocks. For example, the second threshold variance may be an average or weighted average of the variances of the blocks of each level that form the flat block set. In some implementations, the variances of blocks within one level, such as a higher level, may be weighted greater than those in a lower level. Other techniques for combining the variances are possible.

Figure 9:
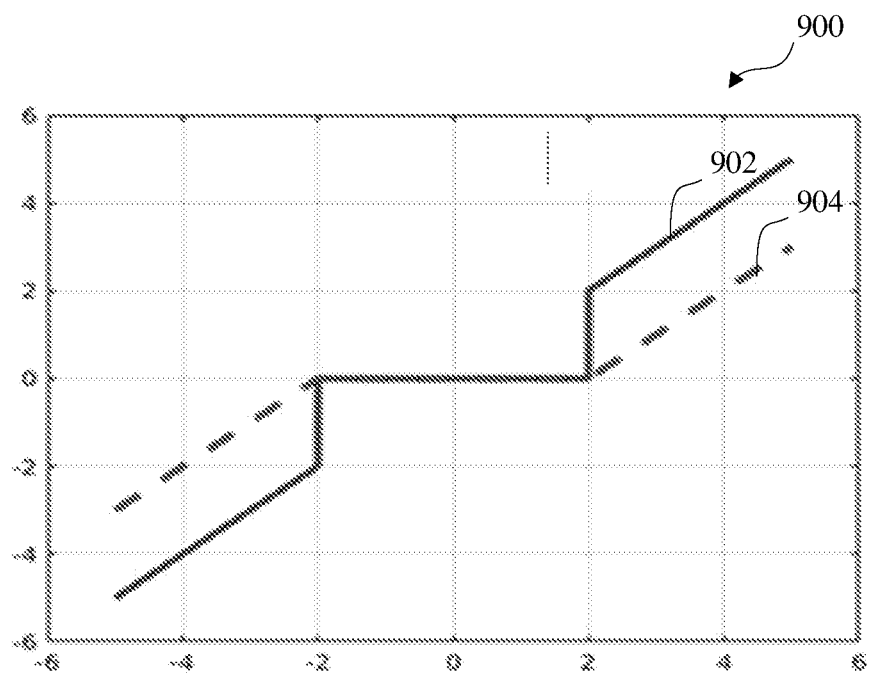
FIG. 9 is a graph comparing hard thresholding to soft thresholding.

Thresholding at least some of the 2-D waveform coefficients at 450 using the second threshold variance may include soft thresholding or hard thresholding the coefficients using the second threshold variance. The graph 900 of FIG. 9, compares the output $\rho_T(x)$ of a hard threshold transfer function to the output $\rho_T(x)$ of a soft threshold transfer function for an input x. More specifically, a hard threshold transfer function is plotted at 902, and a soft threshold transfer function is plotted at 904. The input data comprises, for example, variances for blocks of 2-D wavelet coefficients for an image on the x-axis and an output variance for each block on the y-axis resulting from each of hard and soft thresholding the input variance. The threshold is 0 in FIG. 9 to illustrate the transfer functions more clearly, but the second threshold variance is generally a non-zero (e.g., positive) value.

As explained above, in hard thresholding, the input x (for example, the variance of a block of wavelet coefficients) that has a magnitude larger than the second threshold variance may be left unmodified, and hence the wavelet coefficients are unmodified, while those blocks with smaller variances (e.g., having a magnitude less than the second threshold variance) have their 2-D wavelet coefficients output as 0. In some implementations, the second threshold variance may be converted to a maximum wavelet coefficient value on a per block basis, and then the value can be used to threshold the individual wavelet coefficients in the block. Where the variance is determined according to equation (2), for example, the variance $s^2$ of the block may be set to the second threshold variance and may be used together with the mean $\bar{x}$ of the 2-D wavelet coefficients of the block to generate a single (e.g., positive) value $x_i$. This value $x_i$ may be used to threshold the 2-D wavelet coefficients of a block. An example of a hard threshold transfer function is below, where x is a block variance or a 2-D wavelet coefficient of the block, and T is the threshold (e.g., the second threshold variance or a maximum wavelet coefficient value).

$$\rho_T(x) = \begin{cases} x, & |x| \geq T \\ 0, & |x| < T \end{cases}$$

In contrast, in soft thresholding, the input x (for example, the variance of a block of wavelet coefficients) that is greater than or less than the second threshold variance may be reduced by or increased by the second threshold variance, respectively. The new variance of the block may be used to modify values of the 2-D wavelet coefficients of the block according to any desired technique in this example. Like hard thresholding, a block with a variance having a magnitude smaller than the second threshold variance has its 2-D wavelet coefficients output as 0. As in the description of hard thresholding above, the variance may be used to determine a maximum wavelet coefficient value as the threshold T. An example of a soft threshold transfer function is below.

$$\rho_T(x) = \begin{cases} x - T, & x \geq T \\ x + T, & x \leq T \\ 0, & |x| < T \end{cases}$$

While hard or soft thresholding can be used, the discontinuity present in hard thresholding can manifest as visual artifacts, leading to inefficient noise removal when compared to that of soft thresholding.

Thresholding, using the second threshold variance, at least some of the 2-D wavelet coefficients at the plurality of levels to remove noise at 450 may be performed individually for a subband type to denoise the image. That is, for example, each subband type may have its own second threshold variance determined by using (e.g., combining) the variances of the flat block set. Alternatively, a single second threshold variance may be determined by combining the variances of the flat block sets in each of the subband types to be denoised. Thresholding at 450 may include thresholding all the 2-D wavelet coefficients of a subband associated with a subband type. For example, blocks of a subband associated with a subband type at every level may be thresholded using the second variance threshold for the subband type, whether the second threshold variance is unique to the subband type or is used for thresholding all subband types.

Figure 10:
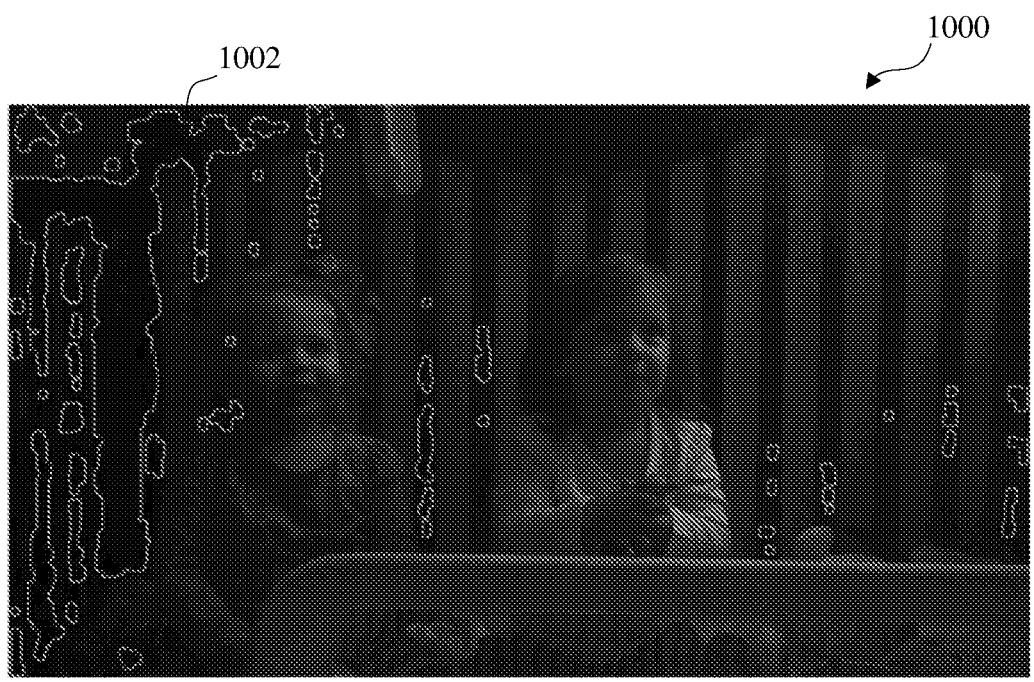
FIG. 10 is a denoised image.

After thresholding, at 460, the method 400 generates a denoised image in the spatial domain using the plurality of levels (e.g., using the 2-D wavelet coefficients of each level, whether the coefficients belong to a subband that was thresholded or not). Generating the denoised image can include performing an inverse wavelet transform using each of the subband types of the levels after thresholding at 450. The inverse wavelet transform is the inverse of the wavelet transform used to generate the wavelet coefficients at 420. FIG. 10 is a denoised image 1000. More specifically, the image 1000 is a denoised image resulting from applying the method 400 to an image. In the image 1000, the marked areas 1002 are those blocks of the flat block set thesholded using the second variance threshold.

While the examples above use variances for blocks and the subbands for denoising, the variance may be used for the methods by first deriving the standard deviation for use in the determinations and thresholding.

In some implementations, the denoised image may be encoded at 470 to generate an encoded denoised image, either as a single image or as part of a sequence of images (e.g., frames) forming a video sequence. The denoised image may be encoded by an encoder. Any encoder may be used, whether the encoder is a lossless encoder or a lossy encoder. One example is in FIG. 11, which is a block diagram of an encoder 1100 in accordance with implementations of this disclosure.

The encoder 1100 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode image data as described herein. The encoder 1100 can be implemented as specialized hardware included, for example, in computing device 100.

The encoder 1100 can encode input image data, such as one or more denoised images 1101 generated at 460, to generate an encoded (compressed) bitstream 480. In some implementations, the encoder 1100 may include a forward path for generating the compressed bitstream. The forward path may include an intra/inter prediction stage 1102, a transform stage 1104, a quantization stage 1106, an entropy encoding stage 1108, or any combination thereof. In some implementations, the encoder 1100 may include a reconstruction path (indicated by the broken connection lines) to reconstruct an image for encoding of further blocks. The reconstruction path may include a dequantization stage 1110, an inverse transform stage 1112, a reconstruction stage 1114, a filtering stage 1116, or any combination thereof. Other structural variations of the encoder 1100 can be used to encode the denoised image(s) 1101 at 470.

For encoding the denoised image(s) 1101, each image can be processed in units of blocks. Thus, a current block may be identified from the blocks in an image, and the current block may be encoded. Because this encoder 1100 can encode multiple images forming frames of a video sequence, a denoised image being encoded and subsequently decoded is referred to as a frame in the description of the encoder 1100 and the decoder 1200. It is worth noting, however, that image coding is similar except that inter prediction is generally omitted.

At the intra/inter prediction stage 1102, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction stage 1102 may subtract the prediction block from the current block (raw block) to produce a residual block. The transform stage 1104 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e., DC) coefficient at the top-left of the matrix and the highest frequency coefficient at the bottom-right of the matrix.

The quantization stage 1106 may convert the transform coefficients into discrete quantum values, which may be referred to as quantized transform coefficients or quantization levels. The quantized transform coefficients can be entropy encoded by the entropy encoding stage 1108 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 480. The compressed bitstream 480 can be formatted using various techniques, such as run-length encoding (RLE) and zero-run coding.

Figure 11:
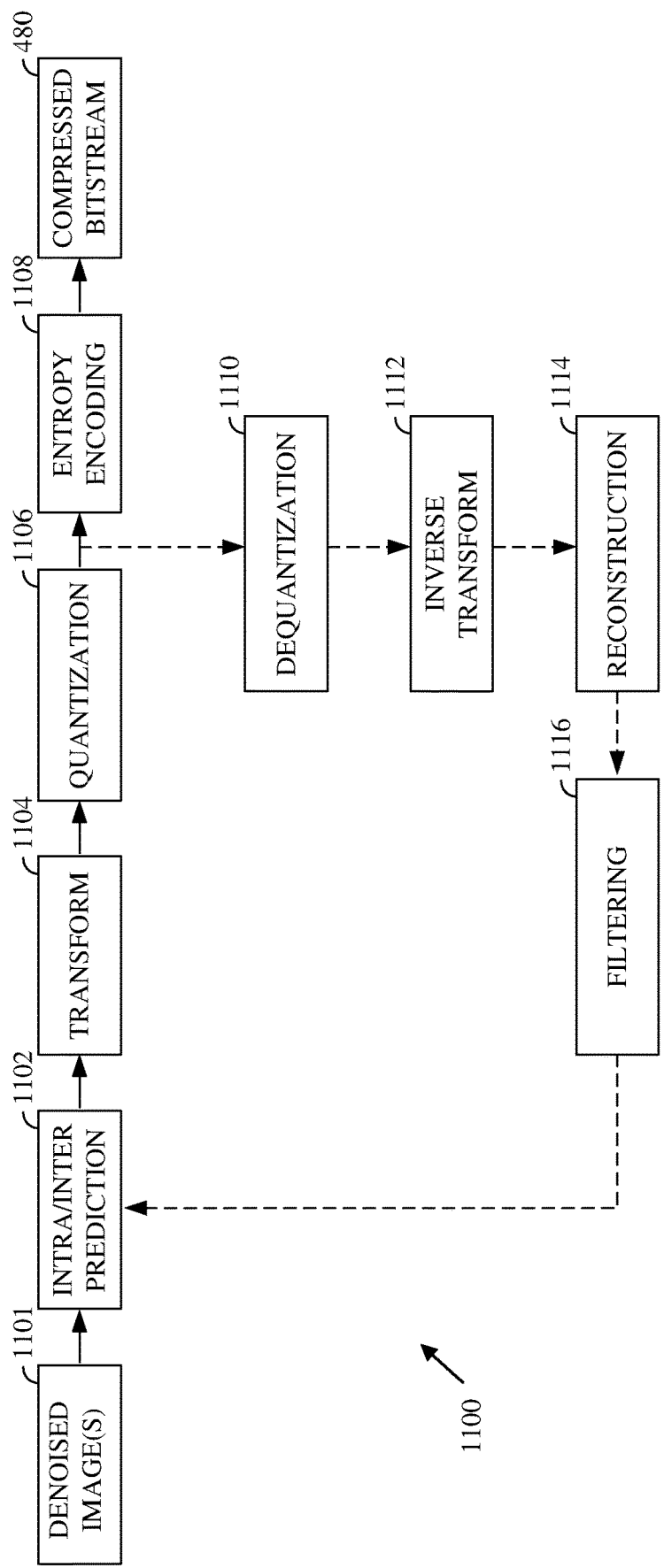
FIG. 11 is a block diagram of an encoder in accordance with implementations of this disclosure.
Figure 12:
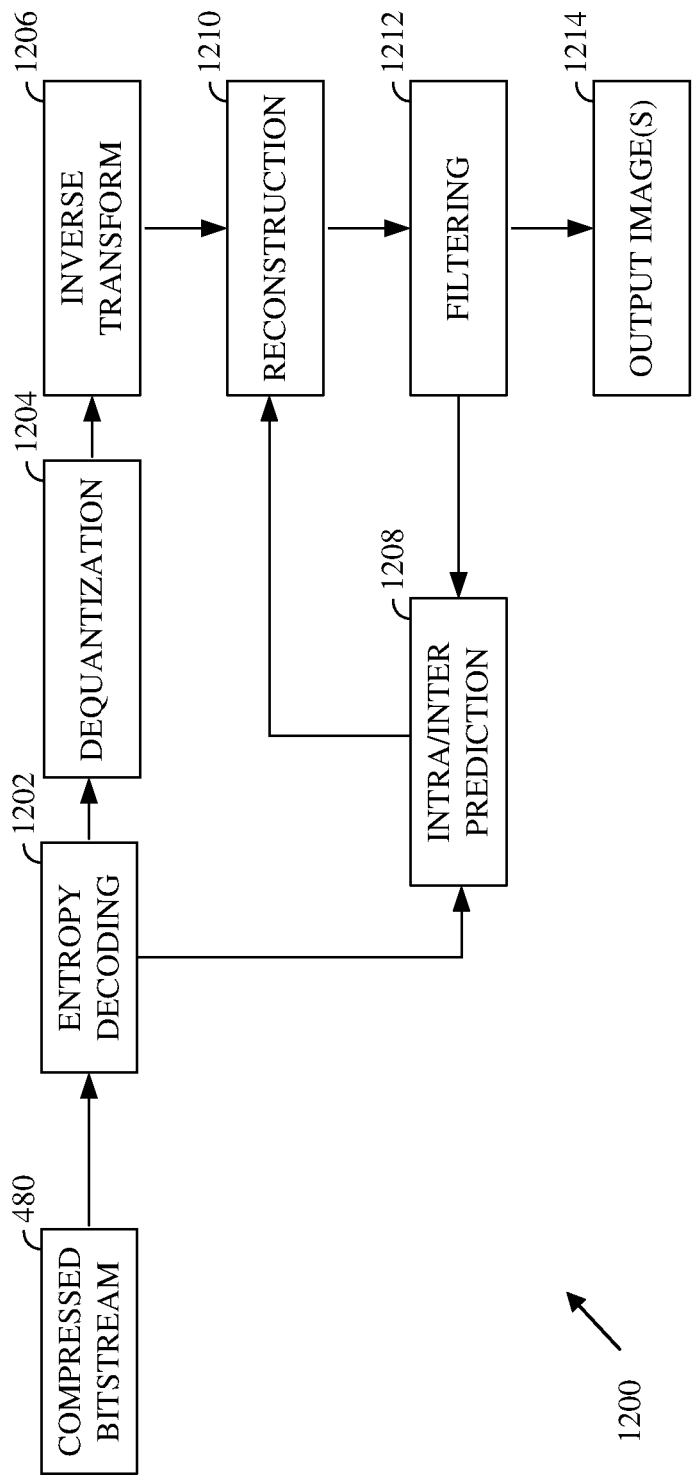
FIG. 12 is a block diagram of a decoder in accordance with implementations of this disclosure.

The reconstruction path can be used to maintain reference frame synchronization between the encoder 1100 and a corresponding decoder, such as the decoder 1200 shown in FIG. 12. The reconstruction path may be similar to the decoding process discussed below and may include decoding the encoded image, or a portion thereof, which may include decoding an encoded block, which in this example includes dequantizing the quantized transform coefficients at the dequantization stage 1110 and inverse transforming the dequantized transform coefficients at the inverse transform stage 1112 to produce a derivative residual block. The reconstruction stage 1114 may add the prediction block generated by the intra/inter prediction stage 1102 to the derivative residual block to create a decoded block. The filtering stage 1116 can be applied to the decoded block to generate a reconstructed block, which may reduce distortion, such as blocking artifacts. Although one filtering stage 1116 is shown in FIG. 11, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line.

Other variations of the encoder 1100 can be used to generate the compressed bitstream 480. For example, a non-transform-based encoder can quantize the residual block directly without the transform stage 1104. In some implementations, the quantization stage 1106 and the dequantization stage 1110 may be combined into a single stage.

Once a denoised image is encoded at 470, the encoded denoised image may be store or transmitted for later decoding. In this example, the compressed bitstream 480 may be decoded to reproduce one or more denoised images using a decoder at 490. The decoder can decode the bitstream in which the denoised image(s) 1101 are encoded. FIG. 12 is a block diagram of a decoder 1200 in accordance with implementations of this disclosure. The decoder 1200 conforms to the encoder 1100, and different decoders are possible, e.g., depending upon the bitstream sent by the encoder used.

The decoder 1200 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 1200 can be implemented as specialized hardware included, for example, in computing device 100.

The decoder 1200 may receive a compressed bitstream, such as the compressed bitstream 480, and may decode the compressed bitstream to generate one or more output images 1214, such as a video stream. The decoder 1200 may include an entropy decoding stage 1202, a dequantization stage 1204, an inverse transform stage 1206, an intra/inter prediction stage 1208, a reconstruction stage 1210, and a filtering stage 1212. Other structural variations of the decoder 1200 can be used to decode the compressed bitstream 480.

The entropy decoding stage 1202 may decode data elements within the compressed bitstream 480 using, for example, Context Adaptive Binary Arithmetic Decoding, to produce a set of quantized transform coefficients. The dequantization stage 1204 can dequantize the quantized transform coefficients, and the inverse transform stage 1206 can inverse transform the dequantized transform coefficients to produce a derivative residual block, which may correspond to the derivative residual block generated by the inverse transform stage 1112 shown in FIG. 11. Using header information decoded from the compressed bitstream 480, the intra/inter prediction stage 1208 may generate a prediction block corresponding to the prediction block created in the encoder 1100. At the reconstruction stage 1210, the prediction block can be added to the derivative residual block to create a decoded block. The filtering stage 1212 can be applied to the decoded block to reduce artifacts, such as blocking artifacts, which may include loop filtering, deblocking filtering, or other types of filtering or combinations of types of filtering, and which may include generating a reconstructed block, which may be output as the output image(s) 1214.

Other variations of the decoder 1200 can be used to decode the compressed bitstream 480. For example, the decoder 1200 can produce the output image(s) 1214 without the filtering stage 1212.

Other implementations of reducing noise are available. In some implementations, additional elements of noise reduction can be added, certain elements can be combined, and/or certain elements can be removed.

As used herein, the terms "optimal", "optimized", "optimization", or other forms thereof, are relative to a respective context and are not indicative of absolute theoretic optimization unless expressly specified herein.

The words "example" or "implementation" are used herein to mean serving as an example, instance, or illustration. Any aspect or design described herein as "example" or "implementation" not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 1100 into an encoded video signal and transmit the encoded video signal to the communications device. In turn, the communications device can then decode the encoded video signal using a decoder 1200. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 1100 may also include a decoder 1200.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method for processing image data, comprising:
generating, for an input image in a spatial domain, two-dimensional (2-D) wavelet coefficients at a plurality of levels, each level of the plurality of levels comprising multiple subbands each associated with a respective subband type in a wavelet domain;
for respective levels of the plurality of levels, identifying a flat region of the subband of the multiple subbands comprising blocks of the subband having a variance no higher than a first threshold variance;
identifying a flat block set for the subband type associated with the subband comprising blocks that are common to respective flat regions of the subband;

determining a second threshold variance using variances of the blocks of the flat block set;

thresholding, using the second threshold variance, at least some of the 2-D wavelet coefficients at the plurality of levels to remove noise; and after thresholding, generating a denoised image in the spatial domain using the plurality of levels.

2. The method of claim 1, comprising, for the subband of the multiple subbands:

determining, for respective levels of the plurality of levels, a variance of the subband; and determining the first threshold variance of the subband type associated with the subband using the respective determined variances for the subband.

3. The method of claim 1, comprising:

for each subband of at least two subbands of the multiple subbands:

determining, for respective levels of the plurality of levels, a variance of the subband of the level; and determining a respective first threshold variance for the subband type associated with the subband using the respective determined variances of the subband for the plurality of levels, wherein:

for respective levels of the plurality of levels, identifying the flat region of the subband comprises identifying the blocks of the subband of the level having a variance no higher than the first threshold variance for the subband type associated with the subband as the flat region of the subband; and identifying the flat block set for the subband type comprises obtaining an intersection of the flat regions of the subband at each level.

4. The method of claim 3, wherein determining, for respective levels of the plurality of levels, the variance of the subband of the level comprises:

dividing the subband into non-overlapping blocks; and determining a respective block variance of each of the non-overlapping blocks of the subband, wherein the variance of the subband comprises a function of the block variances.

5. The method of claim 4, wherein:

the function defines a curve for the subband of the level, and determining the first threshold variance comprises one of:

determining an intersection point of the curves as the first threshold variance;

determining an average of intersection points of the curves as the first threshold variance; or determining a point before convergence of the curves with a defined distance between the curves as the first threshold variance.

6. The method of claim 4, wherein:

the function defines a curve for the subband of the level that maps values for a maximum variance in the subband against an average of the variances over all blocks of the subband with a variance less than the maximum variance, the method further comprising:

determining the first threshold variance for the subband type associated with the subband by one of:

determining an intersection point of the curves as the first threshold variance;

determining an average of intersection points of the curves as the first threshold variance; or determining a point before one of convergence or divergence of the curves within a defined distance between the curves as the first threshold variance.

7. The method of claim 1, wherein generating the 2-D wavelet coefficients at the plurality of levels comprises generating undecimated 2-D wavelet coefficients by applying a Haar transform to the input image in the spatial domain.

8. The method of claim 1, wherein the 2-D wavelet coefficients at the plurality of levels comprise undecimated 2-D wavelet coefficients.

9. The method of claim 1, wherein thresholding the 2-D wavelet coefficients comprises soft thresholding the 2-D wavelet coefficients using the second threshold variance.

10. The method of claim 1, wherein determining the second threshold variance comprises averaging the variances of the blocks of the flat block set.

11. An apparatus for processing image data comprising:

a processor configured to:

generate, for an input image in a spatial domain, two-dimensional (2-D) wavelet coefficients at a plurality of levels, each level of the plurality of levels comprising multiple subbands each associated with a respective subband type in a wavelet domain;

for respective levels of the plurality of levels, identify a flat region of the subband of the multiple subbands comprising blocks of the subband having a variance no higher than a first threshold variance;

identify a flat block set for the subband type associated with the subband comprising blocks that are common to respective flat regions of the subband;

determine a second threshold variance using variances of the blocks of the flat block set;

threshold, using the second threshold variance, at least some of the 2-D wavelet coefficients at the plurality of levels to remove noise; and after thresholding, generate a denoised image in the spatial domain using the plurality of levels.

12. The apparatus of claim 11, wherein the processor is configured to, for the subband of the multiple subbands:

determine, for respective levels of the plurality of levels, a variance of the subband; and determine the first threshold variance of the subband type associated with the subband using the respective determined variances for the subband.

13. The apparatus of claim 11, wherein the processor is configured to:

for each subband of at least two subbands of the multiple subbands:

determine, for respective levels of the plurality of levels, a variance of the subband of the level; and determine a respective first threshold variance for the subband type associated with the subband using the respective determined variances of the subband for the plurality of levels, wherein:

for respective levels of the plurality of levels, to identify the flat region of the subband comprises to identify the blocks of the subband of the level having a variance no higher than the first threshold variance for the subband type associated with the subband as the flat region of the subband; and wherein to identify the flat block set for the subband type comprises to obtain an intersection of the flat regions of the subband at each level.

14. The apparatus of claim 11, wherein to generate the 2-D wavelet coefficients at the plurality of levels comprises to generate undecimated 2-D wavelet coefficients by applying a Haar transform to the input image in the spatial domain.

15. The apparatus of claim 11, wherein the 2-D wavelet coefficients at the plurality of levels comprise undecimated 2-D wavelet coefficients.

16. The apparatus of claim 11, wherein to threshold the 2-D wavelet coefficients comprises to soft threshold the 2-D wavelet coefficients using the second threshold variance.

17. The apparatus of claim 11, wherein:
the plurality of levels comprises three levels; and
the multiple subbands comprise four subbands in the wavelet domain, each of the four subbands associated with one of a low-low (LL) subband type, a low-high (LH) subband type, a high-low (HL) subband type, and a high-high (HH) subband type.

18. The apparatus of claim 11, wherein:
the multiple subbands comprise four subbands in the wavelet domain, each of the four subbands associated with one of a low-low (LL) subband type, a low-high (LH) subband type, a high-low (HL) subband type, and a high-high (HH) subband type; and
the processor is configured to, for at least some of the subbands:
    determine, for each level of the plurality of levels, a variance of the subband of the level; and
    determine a respective first threshold variance for the subband type associated with the subband using the respective determined variances of the subband for the plurality of levels, wherein:
        for respective levels of the plurality of levels, to identify the flat region of the subband comprises to identify the blocks of the subband of the level having a variance no higher than the first threshold variance for the subband type associated with the subband as the flat region of the subband; and
    wherein to identify the flat block set for the subband type comprises to obtain an intersection of the flat regions of a subband associated with the LH subband type, a subband associated with the HL subband type, and a subband associated with the HH subband type at each level of the plurality of levels.

19. The apparatus of claim 11, wherein the processor is configured to:
for at least some subbands of the multiple subbands:
determine, for each level of the plurality of levels, a variance for the subband; and
determine the first threshold variance for a subband type associated with the subband by comparing the respective determined variances of the subband for the plurality of levels, wherein
to identify the flat block set comprises to identify the flat block set comprising blocks that are common to each of the flat regions of the at least some subbands and the plurality of levels, and
to determine the second threshold variance comprises to determine the second threshold variance by combining variances of the blocks of the flat block set.

20. The apparatus of claim 11, wherein the denoised image is an encoded denoised image, the apparatus further comprises a decoder configured to decode the encoded denoised image.

* * * * *